United States Patent [19]
Woods

[11] Patent Number: 4,846,094
[45] Date of Patent: Jul. 11, 1989

[54] INDICATOR FOR ASSISTING BACKING OF A TRAILER OR ANY TYPE OF TOWED VEHICLE

[76] Inventor: John H. Woods, 3012 - 20th Pl., North Chicago, Ill. 60064

[21] Appl. No.: 242,223

[22] Filed: Sep. 9, 1988

[51] Int. Cl.[4] .............................................. B60Q 1/42
[52] U.S. Cl. ..................................... 116/31; 116/303
[58] Field of Search ................... 33/264, DIG. 1, 333, 33/335, 351, 391, 399; 116/28 R, 31, 215, 303; 40/593, 587; 280/477; 180/313

[56] References Cited

U.S. PATENT DOCUMENTS

| | | | |
|---|---|---|---|
| 2,565,381 | 8/1951 | Leighton | 33/399 |
| 3,165,088 | 1/1965 | Hill et al. | 116/31 |
| 3,372,668 | 3/1968 | Chambers | 116/31 |
| 3,605,088 | 9/1971 | Savelli | 340/70 |
| 3,888,500 | 6/1975 | Gauthier | 33/333 |
| 4,044,706 | 8/1977 | Gill | 116/31 |
| 4,656,752 | 4/1987 | Wu | 33/399 |

FOREIGN PATENT DOCUMENTS

| | | | |
|---|---|---|---|
| 532997 | 11/1954 | Belgium | 116/31 |
| 534908 | 2/1955 | Belgium | 116/31 |

*Primary Examiner*—William A. Cuchlinski, Jr.
*Assistant Examiner*—W. Morris Worth
*Attorney, Agent, or Firm*—Hill, Van Santen, Steadman & Simpson

[57] ABSTRACT

An indicator which is attached to the steering wheel of a vehicle and which has a boat indicia and a front wheel position indicator that rotate with the steering wheel and which has a gravity weighted disk-shape member upon which a towing vehicle is indicated as well as a roadway and which remains in the vertical position as the wheel is rotated so that a position of the vehicle and the trailer can be continuously observed.

6 Claims, 1 Drawing Sheet

INDICATOR FOR ASSISTING BACKING OF A TRAILER OR ANY TYPE OF TOWED VEHICLE

BACKGROUND OF THE INVENTION

1. Field of the Invention

This invention relates in general to an indicating device for assisting a driver in backing with a trailer or any type of a towed vehicle and in particular to an improved indicator.

2. Description of the Related Art

Various devices exist for assisting in backing with a trailer. See, for example U.S. Pat. Nos. 4,044,706, 3,605,088, 1,905,717, 3,673,561, 3,877,410, 4,013,034, 1,517,760, 1,653,744 and 1,681,867.

SUMMARY OF THE INVENTION

The present invention comprises an indicator which is attached to the steering wheel and which eliminates the confusion of which way to turn the steering wheel so as to obtain the proper response when backing a towed vehicle such as a boat camping, utility or semi-trailers. The present invention provides the driver with an indication of the direction which the trailer or boat will travel by a simple movement of the steering wheel without requiring that the driver actually start to back the vehicle. The invention gives the driver an indication of the position of the wheels without having to get out of the vehicle to look at them.

It is an object to provide an indicator which has a wheel direction arrow which indicates the direction that the front wheels are turned. As the steering wheel is turned in one direction and then the other, the towed vehicle indicator moves from one side to another.

The indicator of the invention makes it easy for anyone to learn or improve their skills at backing a towed vehicle in that it eliminates the guess work of which way the steering wheels should be turned to obtain the desired response.

It is an object of the present invention to provide a backing assist device which has a front wheel position indicator, has a single pivot and a single moving part which displays the roadway and towing vehicle which always remain in the vertical position independently of the direction the steering wheel is turned. The device is gravity operated and is simple to construct and operate.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure, and in which:

DESCRIPTION OF THE PREFERRED EMBODIMENTS

Figure 1:
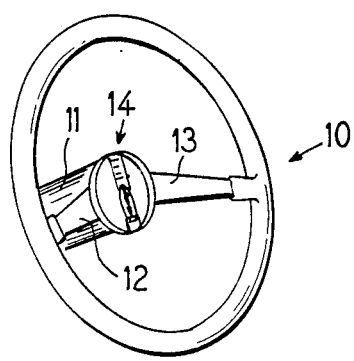
FIG. 1 is a perspective view illustrating the indicator mounted on a steering wheel of a vehicle.

FIG. 1 is a perspective view of a steering wheel 10 of a vehicle which has a steering column 11 and spokes 12 and 13. The steering wheel 10 has a central hub 15 as shown in FIG. 3 and the indicator 14 which is generally disk-shaped can be attached to the hub 15 using hook and material 19 which is attached to the back wall 17 of the indicator 14 and muting material 21 which is attached to the hub 15 by a suitable glue or other means. The indicator 14 has a front transparent disk-shape wall or cover 16 which is attached to the rear wall 17 by cylindrical outer wall 18. A steering wheel indicia 28 is printed on the outer transparent cover 16 and is a front wheel position indicator as shown, for example, in FIGS. 2 and 4.

A boat indicia 23 which has the shape of a boat in top plan view is nonrotatably attached at location 24 to a pin 22 which is nonrotatably attached to the back cover 17 as shown in FIG. 3. Thus, the longitudinal axis of the boat indicia 23 is always aligned with the front wheel position indicator 28.

Figure 2:
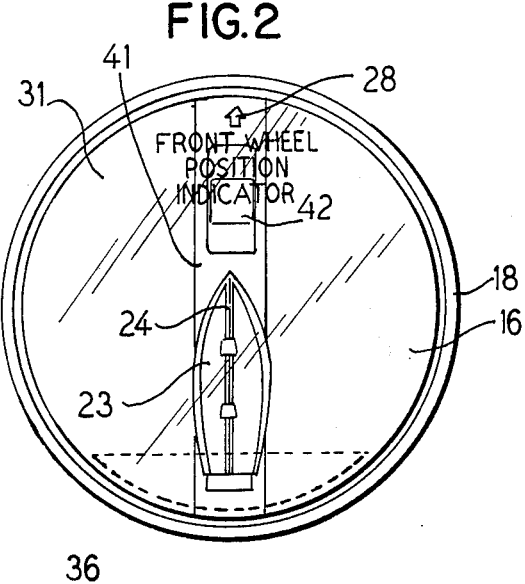
FIG. 2 is a plan view of the indicator with the front wheels pointed straight forward.
Figure 3:
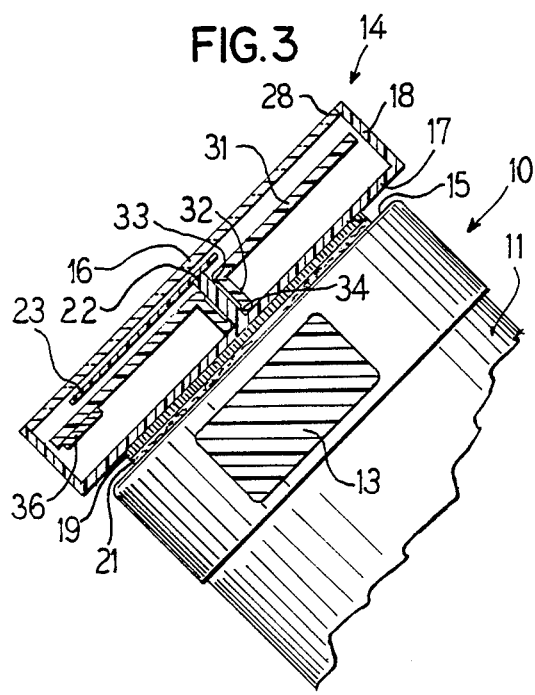
FIG. 3 is a sectional view through the indicator and steering wheel.
Figure 4:
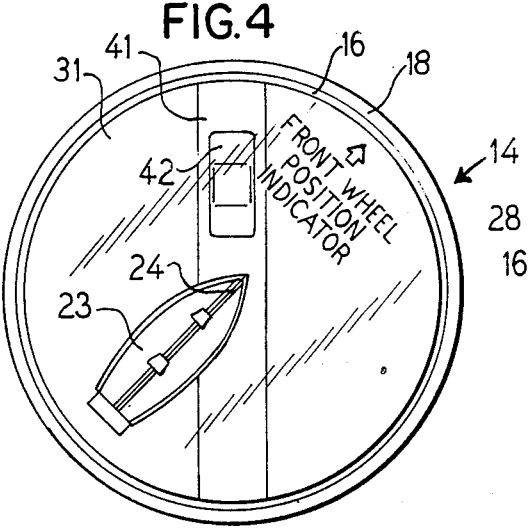
FIG. 4 is a plan view indicating the front wheels turned to the right.
Figure 5:
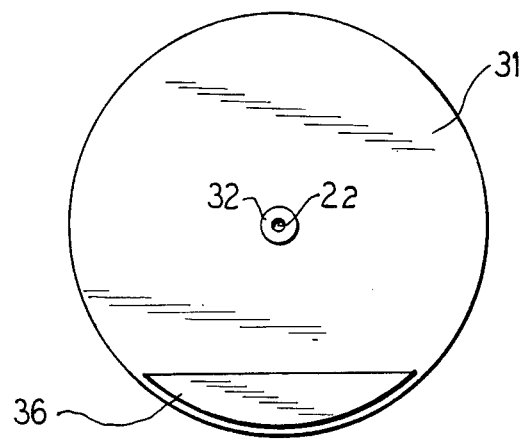
FIG. 5 is a rear view of the gravity controlled vehicle and roadway indicator disk.

A disk 31 is rotatably mounted on the shaft 22 by a shoulder 32 which has bearings 33 and 34 that engage the shaft 22 as shown in FIG. 3. A weight 36 is attached to the rear side of the disk 31 so as to orientate the disk 31 relative to gravity. The front surface of the disk 31 is formed with a roadway indicia 41 upon which an indicia 42 of the towing vehicle is printed as shown in FIGS. 2 and 4.

In operation, when the vehicle is attached to a trailer which is to be towed and with the front wheels pointing straight ahead, the various indicia will have the orientation shown in FIG. 2 wherein the longitudinal axis of the boat 23 is aligned with the roadway 41 and the towing vehicle 42. In this condition, the front wheel position indicator 28 indicates that the front wheel point straight ahead. By moving the front wheels of the vehicle, the boat indicator 23 and the front wheel position indicator 28 will move together and, for example, if the steering wheel is moved clockwise from the straightforward position indicated in FIG. 2 to the position shown in FIG. 4, the boat indicia 23 will move to the position shown in FIG. 4. Thus, if the driver wishes the boat to move to the left of the vehicle as he backs, the steering wheel should be initially turned clockwise from the straightforward position. The disk 31 does not turn with the steering wheel 10 due to the effect of the weight 36 which causes the disk 31 to rotate on the shaft 22 so that the weight 36 remains at the lowest position and the roadway 41 and vehicle 42 rotate relative to the boat indicia 23 and the front wheel position indicator 28.

It is seen that the present invention provides a simple backing assist indicator for backing a vehicle with a trailer or any towed vehicle which includes a gravity position disk upon which a roadway and vehicle are imprinted. It is to be realized that caution should be used when backing particularly with a trailer and the driver should always look in the direction in which he/she is backing.

The present invention indicates the position of the wheels without the driver having to get out to look at them.

Although the invention has been described with respect to preferred embodiments, it is not to be so limited as changes and modifications can be made which are within the full intended scope of the invention as defined by the appended claims.

I claim as my invention:

1. An indicator for assisting backing of a trailer or any type of towed vehicle which is attached to a towing vehicle which has a steering wheel comprising, a first planar member non-rotatably attached to the center of said steering wheel, a first indicia means representing the trailer is non-rotatably attached to said first planar member, a second planar member pivotally supported at a pivot point on said first planar member and provided thereon with a second indicia means representing said towing vehicle, the weight distribution of said second planar member is such that its center of gravity is below said pivot point, whereby the orientation of said first indicia means relative to said second indicia means indicates the direction of travel of the towed vehicle during backing.

2. An indicator for assisting backing of a trailer or any type of towed vehicle according to claim 1 including a weight attached to said second planar member below said pivot point.

3. An indicator for assisting backing of a trailer or any type of towed vehicle according to claim 2 wherein said first and second planar members are disk-shaped.

4. An indicator for assisting backing of a trailer or any type of towed vehicle according to claim 3 wherein a shaft axially extends from said first planar member at its center, said first indicia means is non-rotatably affixed to a distal end of said shaft and said second planar member is pivotally supported about said shaft between said first indicia means and said first planar member.

5. An indicator assisting backing of a trailer or any type of towed vehicle according to claim 3 including a roadway indicia printed on said second planar member.

6. An indicator for assisting backing of a trailer or any type of towed vehicle according to claim 3 including a third transparent planar member which overlies said first and second planar members and is attached to said first planar member, and a third indicia means affixed on said third planar member for indicating the position of the front wheel of the towing vehicle.

* * * * *